Inventor
Raymond E. Morgan
by Charles W Helzer
His Attorney

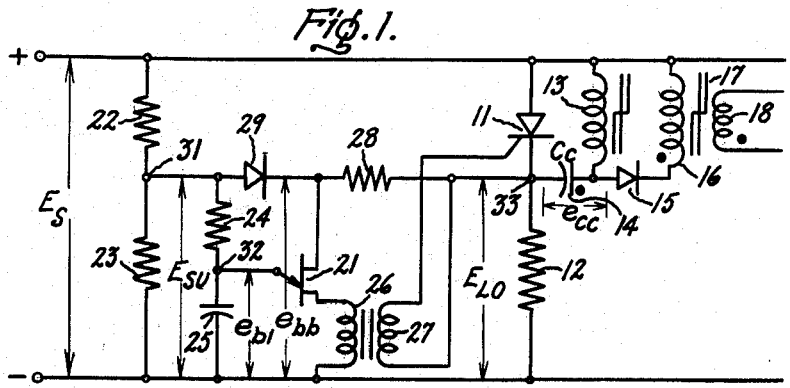

United States Patent Office 3,128,396
Patented Apr. 7, 1964

3,128,396
LOCK OUT CONTROL CIRCUIT FOR
POWER AMPLIFIER
Raymond E. Morgan, Schenectady, N.Y., assignor to General Electric Company, a corporation of New York
Filed Sept. 25, 1961, Ser. No. 140,391
13 Claims. (Cl. 307—88.5)

The present invention relates to an improvement in magnetic controlled rectifier power amplifiers.

More specifically, the invention relates to an improvement in a magnetic controlled recifier power amplifier of the type described in co-pending U.S. patent application Serial Number 833,292, filed August 12, 1959, entitled "Magnetic Silicon Controlled Rectifier Power Amplifier," R. E. Morgan, inventor, now U.S. Patent No. 3,019,355, issued January 30, 1962.

Heretofore magnetic controlled rectifier power amplifiers of the type described in the above identified co-pending application have been limited in the number of uses due to the operating conditions to which the circuits would be subjected. Where conditions were such that wide variations in the load voltage occurred, there was a danger of failure of the circuit to commutate off properly during the commutation period thereby causing a breakdown in operation. This failure to commutate off properly would occur in instances where the capacitor in the communtating circuit had failed to charge adequately to completely turn off the control rectifier of the circuit during the commutation period. Upon this occurrence the controlled rectifier will continue to conduct throughout the commutation period hence causing break-down. To insure against this happening, even under conditions where the load voltage varies over wide ranges, the present invention was devised. Additionally, where two magnetic controlled rectifier power amplifiers of the type described in the above identified co-pending Morgan application, are connected in back to back relationship to operate in a push-pull fashion, it is essential that some precaution be taken to prevent both control rectifiers from being turned on at the same time, thereby providing a direct short current path across the power supply. The present invention makes available a safe means for safely avoiding such a condition.

It is therefore a primary object of the present invention to provide a new and improved magnetic controlled power rectifier amplifier, wherein lock out circuit means are provided to assure against misfiring during the commutation period of the amplifier.

Another object of the invention is to provide a new back to back magnetic controlled power rectifier amplifier having lock out circuit means for preventing simultaneous conduction of both control rectifiers.

In practicing the invention, a control rectifier circuit is provided which includes a control rectifier device and a load element adapted to be connected in series-circuit relationship across a source of electric potential. A commutating circuit is connected across the control rectifier device and comprises a capacitor and saturable reactor connected in series-circuit relationship across the control rectifier device. A firing circuit is coupled to the control gate element of the control rectifier devcice, and lock out circuit means are provided which are operatively connected to the firing circuit means and to the source of lock out signals for locking out operation of the firing circuit during the commutating intervals of the control rectifier device.

Other objects, features and many of the advantages of the invention will be appreciated more readily as the same becomes better understood by reference to the following detailed description, when considered in connection with the accompanying drawings, wherein like parts in each of the several figures are identified by the same reference character and wherein:

FIGURE 1 is a schematic circuit diagram of a new and improved magnetic controlled rectifier power amplifier, which includes a novel lock out circuit means constructed in accordance with the invention;

FIGURE 2 is a schematic circuit diagram of a push-pull version of a new and improved magnetic controlled rectifier power amplifier constructed in accordance with the invention;

FIGURE 8 is a schematic circuit diagram of still another form of lock out circuit means that may be incorporated into the magnetic controlled power rectifier amplifier of FIGURE 1.

Figure 3:
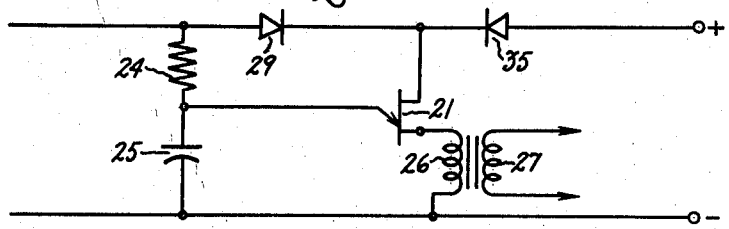
FIGURE 3 is a schematic circuit diagram of a modified form of lock out circuit which can be employed in the power amplifier circuit arrangement shown in FIGURE 1.

The new and improved magnetic controlled rectifier power amplifier circuit shown in FIGURE 1 includes a controlled rectifier device 11, connected in series circuit with a load resistor 12, across the terminals of a direct current power supply represented by the label $E_s$. The controlled rectifier device 11, has a commutating circuit connected across it which is comprised by a saturable inductor 13, and a commutating capacitor 14 connected in series circuit relationship across the controlled rectifier device 11. The saturable inductor 13, in turn has its saturation condition controlled by an "on-time" control circuit connected in parallel with it, and comprised by a diode 15 connected in series circuit with the secondary winding 16, of a saturable transformer 17, whose primary winding 18, is connected to a source of control signals. The manner in which the first saturable inductor 13 and the commutating capacitor 14 co-act to produce a reverse polarity potential across the controlled rectifier device 11 and thereby cause it to commutate off has been described more fully in the above identified co-pending United States application Serial Number 833,292, now U.S. Patent No. 3,019,355, and hence will not again be described in detail. Briefly, however, the operation of the circuit is such that while the controlled rectifier device 11 is conducting due to a gating on signal having been supplied to its control gate element, the charge built up on the commutating capacitor 14 during the preceding period of nonconduction of the controlled rectifier will tend to discharge thru the first saturable inductor 13. Upon the saturable inductor 13 reaching a saturated condition, the polarity of the charge on the capacitor 14 will be reversed. The effect is to place a reverse polarity potential of approximately twice the supply potential value across the controlled rectifier device 11, and thereby turn it off. The additional saturable reactor 16, 18 in conjunction with the diode 15 serves to control the time required for the first saturable inductor 13 to reach saturation, and hence controls the "on time" of the controlled rectifier device 11. From the above description it can be appreciated that in order to assure proper operation of the magnetic controlled rectifier power amplifier, it is essential that the charge on the commutating capacitor 14 be sufficiently high when the saturable inductor 13 saturates so as to assure turning off the controlled rectifier device 11. In order to assure that this condition is indeed met, prior to a gating on signal being supplied to the control gate element of the controlled rectifier device 11, the present invention was devised.

In order to turn on the controlled rectifier device 11 at a predetermined time after each subsequent commutating period, thereby supplying a predetermined amount of electrical power thru the load resistor 12, a firing circuit is provided. This firing circuit is comprised by a unijunction transistor 21 which is energized from a voltage dividing network comprised by a pair of resistors 22 and 23 connected in series circuit relationship across the power supply $E_s$. The two voltage dividing resistors 22 and 23 are in turn connected to a resistance-capacitance frequency determining circuit comprised by a resistor 24, and a capacitor 25, connected in series circuit relationship between the mid tap point of the voltage dividing resistors 22 and 23, and the negative terminal of the power supply $E_s$. The mid tap point of the frequency determining circuit 24, 25 is connected to the emitter electrode of the unijunction transistor 21 which has one base electrode connected thru the primary winding 26 of the coupling transformer to the negative terminal of the power supply $E_s$. The secondary winding 27 of the coupling transformer is connected to the control gate element of the controlled rectifier device 11. The remaining base electrode of the unijunction transistor 21 is connected thru a coupling resistor 28 to the junction of the controlled rectifier device 11 and the load resistor 12 as well as to one plate of the commutating capacitor 14, and is also connected through a blocking diode 29 back to the mid tap point of the voltage dividing resistors 22 and 23.

The power amplifier circuit of FIGURE 1 is designed in a manner such that the RC time constant of the resistor 24 and capacitor 25 is approximately equal to or less than the commutating period of the control rectifier as determined by the time constant of the saturable inductor 13 and commutating capacitor 14. Preferably, the commutating period of the controlled rectifier device 11, should be designed to be somewhat shorter than the RC time constant of the unijunction transistor oscillator 21. With the circuit thus designed, the firing circuit will operate as a free running unijunction transistor oscillator at a frequency determined by the time constant of the resistor 24 and capacitor 25 for so long as the condition is met that the base to base voltage of the unijunction transistor 21 $e_{bb}$ does not exceed approximately twice the emitter to base voltage $e_{b1}$; that is to say $e_{bb} \approx< 2e_{b1}$. When the base to base voltage of the unijunction transistor $e_{bb}$ does exceed twice the emitter to base voltage $e_{b1}$, then the unijunction transistor 21 will be locked out from conducting. From a consideration of FIGURE 1 it can be seen that the base to base voltage of the unijunction transistor 21 $e_{bb}$ will be determined primarily by the potential fed back thru the coupling resistor 28 from the point 33. This voltage represents the lock out voltage $E_{LO}$. It can also be appreciated that $E_{LO}$ actually represents the load voltage across the load resistor 12 and will equal approximately the supply voltage $E_s$ as long as the controlled rectifier device 11 is conducting. It is only when the controlled rectifier device 11, is turned off that the lock out voltage $E_{LO}$ will drop to a sufficiently low value to satisfy the relation $e_{bb} < 2e_{b1}$. Accordingly, for as long as the controlled rectifier device 11 is conducting the lock out voltage $E_{LO}$ will be so high that the potential coupled back through the coupling resistor 28 will drive the base to base voltage $e_{bb}$ of the unijunction transistor 21 to a value far in excess of $2e_{b1}$. During this portion of the operating period the blocking diode 29 de-couples the resistance capacitance frequency determining network 24 and 25 from the coupling resistor 28 so that the capacitor 25 can be charged to almost the full value of the potential at the point 31. Thereafter, upon the controlled rectifier device being turned off by the commutating circuit 13, 14 in the previously described manner, the potential $E_{LO}$ across the load resistor 12 will drop to a sufficiently low value to reduce $e_{bb}$ to a value equal to or less than $2e_{b1}$ thereby allowing the unijunction transistor 21 to turn on. This results in producing a gating signal pulse in the primary winding 26 of the coupling transformer which is coupled through the secondary winding 27 to the control gate element of the controlled rectifier device 11, thereby again turning the rectifier device 11 on and starting a new cycle of operation. It should be noted that during the period of conduction, of the controlled rectifier device 11, the point 33 effectively reflects the potential across the commutating capacitor 14. Hence, at the instant that the saturable inductor 13 saturates, the potential at this point will jump to approximately double the value of the supply voltage so that the potential across the controlled rectifier device 11 is indeed reversed. At this instant, it is critical that the control gate element of the controlled rectifier device 11 not be turned on by the unijunction transistor oscillator firing circuit 21. Since at this instant, the point 33 is twice the supply potential $E_s$ it is apparent that the base to base voltage of the unijunction transistor 21 $e_{bb}$ will greatly exceed $2e_{b1}$ so that there is no danger of the unijunction transistor oscillator 21 producing a firing gating pulse in its output circuit. Accordingly, proper commutation off of the controlled rectifier device 11 is assured.

A modified form of lock out circuit suitable for use with the magnetic controlled power amplifier of FIGURE 1 is shown in FIGURE 3. The lock out circuit shown in FIGURE 3 is in all essentials identical to the lock out circuit described with relation to FIGURE 1, with the exception that a coupling diode 35 is used in place of the coupling resistor 28 for applications where the lock out voltage $E_{LO}$ does not greatly exceed the base to base voltage $e_{bb}$ rating of the unijunction transistor 21. In such a situation, the use of the coupling diode 35 in place of the coupling resistor 28 increases the sensitivity of the lock out circuit without endangering the unijunction transistor 21.

Figure 4:
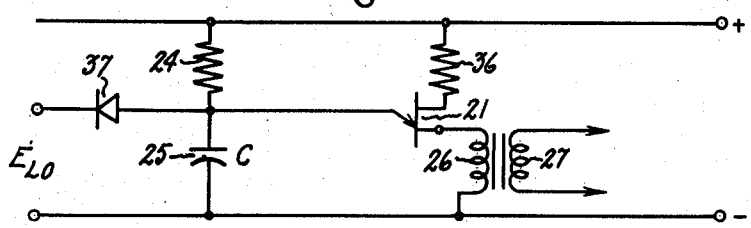
FIGURE 4 is a schematic circuit diagram of still another from of lock out circuit usable with the new and improved magnetic controlled rectifier power amplifier of FIGURE 1.

Another form of lock out circuit suitable for use with the magnetic controlled power amplifier of FIGURE 1, but which does not employ the load voltage as a lock out voltage $E_{LO}$, is shown in FIGURE 4 of the drawings. In FIGURE 4, like parts of the lock out circuit are identified by the same reference numerals used with relation to the circuit shown in FIGURE 1. Hence the lock out circuit is formed by a unijunction transistor 21 having one of its base electrodes connected through the primary winding 26 of the coupling transformer to the negative terminal of the power supply, and the remaining base electrode coupled through a load resistor 36 to the positive terminal of the power supply. A frequency determining resistor capacitor circuit 24, 25 is connected across the power supply with its mid tap point connected directly to the emitter electrode of the unijunction transistor 21. The mid tap point of resistor 24 and capacitor 25 is also connected through a blocking diode 37 to a source of lock out voltage signals $L_{LO}$. It is anticipated that this source of lock out voltage signals $E_{LO}$ will comprise any point on the power rectifier circuit where it is desired to sense an under voltage condition. This may comprise an under voltage release, or battery charging connection or any other similar point where it is desired to sense a drop in the voltage from a higher to a lower value.

In operation, the resistance capacitance network 24, 25 in conjunction with the unijunction transistor 21 normally will operate as a free running unijunction transistor oscillator at a frequency determined by the RC time constant of the resistor 24, 25. This condition is allowed to continue for so long as no under voltage condition exists, and the blocking diode 37 remains in blocking condition. Upon a drop in voltage occurring at the point where it is desired that an under voltage condition be sensed, the undervoltage will reduce the value of the lock out voltage $E_{LO}$ so that the blocking diode 37 will be rendered conductive, and will bleed off the charge on the capacitor 25. There is a time delay inherent in the operation of discharging capacitor 25 through diode 37, so that the circuit will possess a time lag feature that assures response of the circuit only to continued under voltage conditions, and transient under voltage condition do not adversely affect its operation. After discharge of capacitor 25 through diode 37, the condition for conduction through unijunction transistor 21 that $e_{b1}$ equals one-half $e_{bb}$ cannot be met, and the unijunction transistor 21 will not be rendered conductive. This lock out will continue for so long as the emitter to base $e_{b1}$ voltage cannot rise above the relation one-half of the base to base voltage $e_{bb}$. Thereafter, if the under voltage condition is corrected so that the blocking diode 37 is again placed in a blocking condition, the unijunction transistor oscillator will be returned to its free running condition so as to produce output gating pulses across the output transformer 26, 27 at the predetermined rate.

Figure 5:
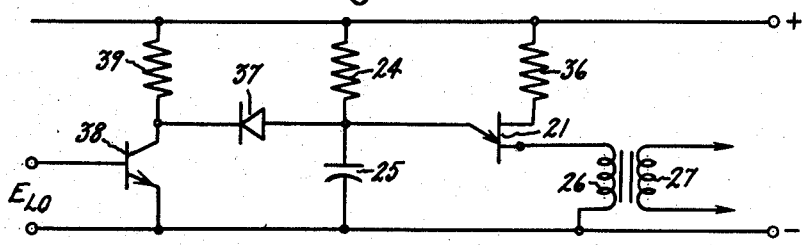
FIGURE 5 is a schematic circuit diagram of still a third form of lock out circuit means that can be employed with the new and improved magnetic controlled rectifier power amplifier of FIGURE 1.

A modified form of the lock out circuit shown in FIGURE 4, is illustrated in FIGURE 5 of the drawings. The holding circuit of FIGURE 5 is identical in all respects to the holding circuit of FIGURE 4 in its construction and operation with the exception that a resistance coupled transistor amplifier comprised by a transistor 38 and load resistor 39 is added between the source of lock out signals $E_{LO}$ and the blocking diode 37. The blocking diode is connected to the load resistor of the transistor amplifier and the base electrode of the transistor 38 is connected to the source of lock out signals $E_{LO}$. By this arrangement the transistor amplifier serves to amplify the lock out signal as well as to provide a phase reversal so that an over voltage condition can be sensed. In operation, as long as the voltage at the point being sensed is normal, that is, it's maintained at its designed value, conduction through the transistor 38 will be such as to maintain the blocking diode 37 in its blocking condition. As long as the blocking diode 37 is blocked the unijunction transistor oscillator 21 will operate in its normal fashion to produce gating pulses across the output coupling transformer 26, 27 at the predetermined rate. However, upon the occurrence of an over voltage condition, conduction through the transistor 38 will be increased to the point to allow conduction to take place through the blocking diode 37 thereby removing the charge from the capacitor 25 and locking out operation of the unijunction transistor oscillator 21 as previously described. This lock out will continue for as long as the over voltage condition exists. Thereafter, if the over voltage is correceted to return the circuit being controlled to its normal operating condition, conduction through the transistor 38 is decreased so that the potential on the emitter electrode of the locking diode 37 would be raised to a point to again return it to its blocking condition and allowing the unijunction transistor oscillator to operate normally to produce output gating pulses across the output of the coupling transformer 26, 27.

Figure 6:
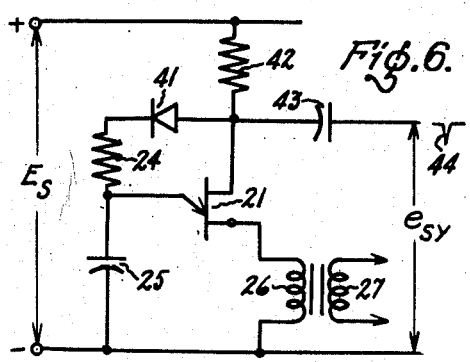
FIGURE 6 is a schematic circuit diagram of still a fourth form of lock out circuit means constructed in accordance with the present invention.

While the lock out circuits shown in FIGURES 4 and 5 of the drawings are used to sense and to lock out operation of the magnetic controlled power amplifier, it may sometimes be desirable to provide for synchronized application of the gating signal developed by the unijunction transistor oscillator to the control gate element. For this purpose, the circuit in FIGURE 6 is provided. The lock out circuit of FIGURE 6 includes an unijunction transistor 21 having a resistance-capacitance frequency determining circuit 24, 25 connected through a blocking diode 41 and dropping resistor 42 across a direct current power supply $E_s$. The mid tap point of the resistance capacitance frequency determining circuit 24, 25 is connected to the emitter electrode of the unijunction transistor 21, and one base electrode of the unijunction transistor is connected through the primary winding 26 of the output coupling transformer to the negative terminal of the direct current power supply. The remaining base electrode of the unijunction transistor 21 is connected to the junction of the blocking diode 41 and the dropping resistor 42. Also connected at this junction point is a coupling capacitor 43 which is connected to a source of transient or pulselike block out signals that are negative going in character as indicated at 44. It can be appreciated from an examination of FIGURE 6 that the circuit normally will operate as a free running unijunction transistor oscillator charging the capacitor 25 through the resistor 24 blocking diode 41 and dropping resistor 42 at a rate determined by the RC time constant of this circuit. When the charge on the capacitor exceeds the relation of the emitter to base voltage equalling one-half the base to base voltage, the transistor 21 conducts producing an out put gating pulse in the out put coupling transformer 26, 27. Upon the occurrence of a negative going transient lock out pulse as indicated at 44, the base to base voltage of the unijunction transistor 21 will be instantaneously reduced so that the relation of the emitter to base voltage equalling at least one-half the base to base voltage will be met, and the transistor 21 will be rendered conductive at a point in time earlier than would otherwise occur thereby producing an output gating pulse in the output coupling transformer which is synchronized with the negative going synchronizing pulse 44 supplied through the coupling capacitor 43.

Figure 7:
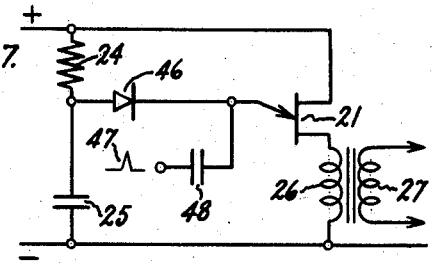
FIGURE 7 is a schematic circuit diagram of still another form of lock out circuit means constructed in accordance with the present invention.

A modified form of the synchronizing circuit arrangement shown in FIGURE 6 is illustrated in FIGURE 7 wherein a positive going synchronizing pulse may be employed. The circuit in FIGURE 7 includes a unijunction transistor oscillator formed by the unijunction transistor 21 and the resistance-capacitance frequency, determining network 24, 25. The junction of the frequency determining network is connected through a blocking diode 46 to the emitter electrode of the unijunction transistor. One base electrode of the unijunction transistor is connected through the primary winding 26 of the output coupling transformer to the negative terminal of the direct current power supply and the remaining base electrode of the unijunction transistor 21 is connected back directly to the positive terminal of the direct current power supply. The source of positive going synchronizing pulses indicated at 47 is coupled through a coupling capacitor 48 through the emitter electrode of the unijunction transistor 21. By this arrangement, the circuit will operate normally as a free running unijunction transistor oscillator producing out put gating pulses at the frequency determined by the RC time constant of the frequency determining circuit 24, 25. Upon the occurrence of a positive going synchronizing pulse 47, which is coupled through the coupling capacitor 48, to the emitter electrode of the unijunction transistor 21 the emitter to base voltage of the unijunction transistor will be raised instantaneously to exceed the relation $e_{b1}$ equal to a greater than one-half $e_{bb}$ thereby causing the unijunction transistor 21 to be rendered conductive, and to produce an output gating pulse through the output coupling transformer 26, 27. In the absence of the positive going synchronizing pulses 47, the unijunction transistor oscillator will thereafter return to its normal operation at a frequency determined by the RC time constant of the resistor 24, and capacitor 25.

A push-pull version of a magnetic controlled power amplifier constructed in accordance with the invention is illustrated in FIGURE 2 of the drawings. This circuit employs a modified version of the lock out circuit means to insure proper turning on of the controlled rectifiers in the power amplifier in a predetermined sequence. The circuit includes a pair of controlled rectifiers 11' and 11" connected in series circuit relationship across a source of direct current electric potential $E_s$ as illustrated. A load resistor 12' is connected to a mid tap point on the direct current source of electric potential (not shown) and between the juncture of the two controlled rectifiers 11' and 11". The controlled rectifier 11' has a commutating circuit connected across it which is comprised by a saturable inductor 13' and commutating capacitor 14' together with their associated time on control saturable reactor 16', 18' and isolating diode 15'. As the construction and operation of the commutating circuit is identical to that described with the relation to the circuit shown in FIGURE 1, a further discussion of these elements is believed unnecessary.

The control gate element of the controlled rectifier 11' is connected to a gating control signal source comprised by a unijunction transistor 21' having its emitter electrode connected to the juncture of a resistance capacitance frequency determining network comprised by a capacitor 25' and a resistor 24' connected in series circuit relationship with a voltage dropping resistor 22' across a direct current power supply $E_{suA}$. The base electrode of the unijunction transistor 21 is connected through the primary winding 26 of a coupling transformer through the negative terminal of the sub power supply $E_{suA}$ and the secondary winding is connected to the control gate element of the control rectifier 11'. The remaining base electrode of the unijunction transistor 21 is connected to the juncture of a blocking diode 29' and a coupling diode 35' in a fashion identical to the circuit arrangement shown in FIGURE 3 of the drawings. The coupling diode 35' in turn is connected to the collector load resistor 51 of a resistance coupled transistor amplifier formed by a transistor 52 having its emitter electrode connected to the negative terminal of the power supply $E_{suA}$ and having its base electrode connected through a voltage limiting resistor 53 to the juncture of two controlled rectifiers 11', 11". By this arrangement, the transistor amplifier 52 will serve to amplify and reverse the polarity of the signal supplied through the coupling diode 35' to lock out the unijunction transistor oscillator 21 in a manner described more fully hereinafter.

The controlled rectifier 11" similarly has a commutating circuit connected across it formed by a commutating capacitor 14" and a saturable reactor 13" together with their associated time on control reactor 16" and 18" and isolating diode 15". This commutating circuit will function in the same manner as the commutating circuit 13, 14 described with relation to FIGURE 1, and hence will not be described further. With respect to the firing control circuit, the gate control element of the control rectifier 11" is connected directly to one base electrode of a unijunction transistor 21" having its remaining base electrode coupled back through a coupling resistor 28" to the juncture of the two controlled rectifiers 11', 11". The emitter electrode of the unijunction transistor 21" is connected to the mid tap point of the resistance capacitance frequency determining network 24", 25" connected across the power supply $E_{suB}$. The high voltage end of the resistor 24" is connected to the collector element of an isolating or blocking diode 29" having its emitter element connected to the coupling resistor 28". This lock out circuit is identical in construction and operation to the lock out circuit shown in FIGURE 1 of the drawings with the exception that no coupling output transformer is used to couple the output of the unijunction transistor oscillator to the control gate element of the controlled rectifier device 11".

With the circuit constructed in the above described manner, it is assumed that the circuit is functioning properly when first one control rectifier device, for example 11' is conducting while the remaining control rectifier device, 11" is not conducting, and then the reverse condition occurs. It can be appreciated from the examination of FIGURE 2 that if both control rectifier devices were conducting simultaneously there would be a dead short circuit across the power supply which would be disastrous. To avoid this condition the lock out circuit arrangements have been modified in the manner indicated. If as assumed above the control rectifier device 11' is conducting then the point 55 will be held at essentially the full positive value of the direct current power supply. This results in a large potential which greatly exceeds the relation required for conduction through transistor 21" namely that the base to base voltage $e_{bb}$ of the unijunction transistor 21" equal appproximately two times the emitter to base voltage so that the unijunction transistor 21" will be locked out from conducting for as long as the control rectifier device 11' continues to conduct. Thereafter, upon the commutating circuit 13', 14' associated with the control rectifier device 11' turns off the control rectifier device, the potential at the point 55 drops to a value sufficient for the relation $e_{bb}$ equal to or less than $2e_{b1}$ so that the unijunction transistor oscillator 21" will be allowed to conduct. Conduction through transistor 21" produces a gating pulse that is supplied to the controlled rectifier device 11" thereby turning on the controlled rectifier device 11". While the controlled rectifier device 11" is conducting, the point 55 will be essentially at the negative value of the direct current power supply and it in turn clamps the base electrode of the transistor amplifier 52 to that value through coupling resistor 53 so that it cannot turn on. Thereafter, upon commutating circuit 14", 13" turning off the controlled rectifier device 11" the value of the potential at the point 55 will start to rise, and this rise in potential will be sensed by the transistor amplifier 52 which will amplify the rise in potential and couple it through the coupling diode 35 to thereby turn on or unlock the unijunction transistor 21. This produces an output gating pulse that is supplied through the coupling transformer 26, 27', to turn on the control rectifier device 11'. By this arrangement, it can be seen that the two lock out circuits associated with the two controlled rectifier devices 11' and 11" assure that alternate ones of the devices cannot be turned on while the other device is conducting. This insures against a dead short being produced across direct current power supply.

A different form of lock out circuit means for use in a magnetic controlled rectifier power amplifier which does not employ a unijunction transistor oscillator is illustrated in FIGURE 8 of the drawing. While the circuit arrangement in FIGURE 8 is not quite so efficient and hence not preferred over the previous described arrangements employing unijunction transistor oscillators, it is a practical way of enforcing a lock out of the gating on signal from magnetic controlled rectifier power amplifier. This lock out circuit arrangement includes a coupling transformer 61 having its primary winding connected across the source of lock out signal $E_{LO}$ which must be alternating in nature. The secondary winding of the coupling transformer 61 is connected across a suitable load resistor 62 and diode rectifier 63, which are connected in a closed circuit relationship by a plurality of voltage limiting diode rectifiers 64. This circuit arrangement is connected directly to the gate control element of the control rectifier device 11 as shown in FIGURE 8 of the drawing along with the gate signal suppied by the gating signal source not shown through the conductor 65. It can be appreciated that with this arrangement, for as long as the lock out voltage is present, a negative bias will be produced across the resistor 62 which will maintain the gate control element of the control rectifier device 11 sufficiently negative to prevent the gating signal supplied over the conductor 65 from turning on the control rectifier device. In this phase of the operation, the isolating diode 64 served to prevent the lock out circuit from constituting a drain on the gating signal source. If desired, a Zener diode could be used for this purpose in place of the multiple diode rectifiers illustrated. Thereafter, should the lock out signal $E_{LO}$ be removed the negative bias developed across the load resistor 62 will be removed so that the positive going gating signals supplied across the conductor 65 will be adequate to turn on the control rectifier device. It is anticipated that this arrangement would of course be incorporated in a magnetic controlled power amplifier similar to that shown in FIGURE 1 of the drawings or in a similar arrangement wherein it is desired to lock out firing of the controlled rectifier device during some predetermined commutation period.

From the foregoing description, it can be appreciated that the invention provides a new and improved magnetic controlled power rectifier wherein lock out circuit means are provided to assure that the gate control element of the controlled rectifier device used in the circuit is not fired during the commutation period. Additionally, this circuit makes available a new and improved back to back push-pull power amplifier wherein it is assured that simultaneous conduction of the two control rectifiers in the power amplifier does not occur.

Having described several embodiments of a new and improved magnetic controlled power amplifier device constructed in accordance with the invention, it is believed obvious that other modifications and variations of the invention are possible in light of the above teachings. It is therefore to be understood that changes may be made in the particular embodiment of the invention described which are within the full intended scope of the invention as defined by the appended claims.

What I claim as new and desire to secure by Letters Patent of the United States is:

1. A controlled rectifier circuit including in combination a controlled rectifier device, a load element adapted to be connected in series circuit relationship with said controlled rectifier device across a source of electric potential, a commutating circuit including a capacitor connected across said controlled rectifier device, firing circuit means coupled to the control gate element of said controlled rectifier device, and lock out circuit means operatively coupled to said firing circuit means and to said load element and responsive to the potential across the load element for locking out operation of said firing circuit during commutating intervals of said controlled rectifier device.

2. A controlled rectifier circuit including in combination a controlled rectifier device, a load element adapted to be connected in series circuit relationship with said controlled rectifier device across a source of electric potential, a commutating circuit including a capacitor connected across said controlled rectifier device, firing circuit means coupled to the control gate element of said controlled rectifier device, and lock out circuit means operatively coupled to said firing circuit means and to the capacitor in said commutating circuit to lock out operation of said firing circuit during commutating intervals of said controlled rectifier device.

3. The combination set forth in claim 1 wherein said firing circuit means comprises a unijunction transistor oscillator having its output operatively coupled to the control gate element of said controlled rectifier device and wherein said lock out circuit means comprises a feed-back connection between the capacitor in said commutating circuit and the unijunction transistor-oscillator for turning the oscillator on and off in response to the charge on said capacitor.

4. The combination set forth in claim 1 wherein said firing circuit means comprises a unijunction transistor, a series connected resistor and capacitor connected across at least a portion of said source of electric potential and having their mid tap coupled to the emitter electrode of the unijunction transistor, a coupling transformer having its secondary winding connected to the control gate electrode of the controlled rectifier device and having its primary winding connected to one base electrode of the unijunction transistor, the remaining base electrode of the unijunction transistor being connected through a feedback connection to the capacitor in the commutating circuit whereby said unijunction transistor will be turned on and off in response to the charge on the capacitor.

5. The combination set forth in claim 1 wherein said firing circuit means comprises a resistance-capacitance unijunction transistor-oscillator having its output operatively coupled to the control gate element of said controlled rectifier device and wherein said lock out circuit means comprises a resistor interconnected between said capacitor in the commutating circuit and one base electrode of the unijunction transistor of the oscillator and a hold-off diode interconnected between the said base electrode of the unijunction transistor and the resistance-capacitance biasing network of the unijunction transistor oscillator.

6. The combination set forth in claim 1 wherein said firing circuit means comprises a resistance-capacitance unijunction transistor-oscillator having its output operatively coupled to the control gate element of said controlled rectifier device and wherein said lock out circuit means comprises a coupling diode interconnected between said capacitor in the commuting circuit and one base electrode of the unijunction transistor of the oscillator and a hold-off diode interconnected between the juncture of the coupling diode and the base electrode of the unijunction transistor and the resistance-capacitance biasing network of the unijunction transistor oscillator.

7. A controlled rectifier circuit including in combination a controlled rectifier device, a load circuit adapted to be connected in series circuit relationship with said controlled rectifier device across a source of electrical potential, a commutating circuit comprising a capacitor and a saturable reactor connected in series circuit relationship across said controlled rectifier device, firing circuit means comprising a unijunction transistor-oscillator having a resistance-capacitance frequency determining circuit, and having its output operatively coupled to the control gate element of said controlled rectifier device, and an undervoltage feedback connection comprising a blocking diode connected between the mid tap point of resistance-capacitance frequency determining circuit of the unijunction transistor-oscillator and the point on the load circuit where it is desired that an undervoltage condition be sensed.

8. A controlled rectifier circuit including in combination a controlled rectifier device, a load circuit adapted to be connected in series circuit relationship with said controlled rectifier device across a source of electric potential, a commutating circuit comprising a capacitor and a saturable reactor connected in series circuit relationship across said controlled rectifier device, firing circuit means comprising a unijunction transistor-oscillator having a resistance-capacitance frequency determining circuit and having its output operatively coupled to the control gate element of said controlled rectifier device, and an overvoltage feedback connection comprising a blocking diode connected to the resistance-capacitance frequency determining circuit of the unijunction transistor-oscillator and a resistance coupled transistor amplifier having its output connected to the blocking diode and having the point on the load circuit where it is desired that an overvoltage condition be sensed.

9. A controlled rectifier circuit including in combination a controlled rectifier device, a load circuit adapted to be connected in series circuit relationship with said controlled rectifier device across a source of electric potential, a commutating circuit comprising a capacitor and a saturable reactor connected in series circuit relationship across said controlled rectifier device and a firing circuit coupled to the control gate element of said controlled rectifier device and comprising a unijunction transistor-oscillator having a series connected resistance-capacitance frequency determining circuit coupled across the base-to-base elements of a unijunction transistor and having the emitter element of the unijunction transistor connected to the midpoint of the resistance-capacitance frequency determining circuit, a synchronizing signal pulse input capacitor coupled to the emitter electrode of the unijunction transistor, and a blocking diode connected between one end of the resistor in the resistance-capacitance network and the emitter electrode of the unijunction transistor to which the input capacitor is connected.

10. A controlled rectifier circuit including in combination a controlled rectifier device, a load circuit adapted to be connected in series circuit relationship with said controlled rectifier device across a source of electric potential, a commutating circuit comprising a capacitor and a saturable reactor connected in series circuit relationship across said controlled rectifier device, and a firing circuit coupled to the control gate element of said controlled rectifier device and comprising a unijunction transistor-oscillator having a series connected resistance-capacitance frequency determining circuit coupled across the base-to-base elements of a unijunction transistor and having the emitter element of the unijunction transistor connected through a blocking diode to the midpoint of the resistance-capacitance frequency determining circuit, and a synchronizing signal pulse input capacitor coupled to the emitter electrode of the unijunction transistor.

11. A controlled rectifier circuit including in combination a pair of controlled rectifier devices connected in series circuit relationship across a source of electric potential, a load circuit connected between the juncture of the two controlled rectifier devices and a mid tap point on the source of electric potential, a respective associated commutating circuit each comprising a capacitor and saturable inductor connected in series circuit relationship across each of said controlled rectifier devices, a firing circuit for a first one of said controlled rectifier devices comprising a first unijunction transistor oscillator having its output operatively coupled to the control gate element of the first controlled rectifier device, first lock out circuit means operatively coupled to said first unijunction transistor oscillator and to said load circuit for locking out the operation of the first unijunction transistor oscillator during periods of conduction of the second controlled rectifier, a firing circuit for the control controlled rectifier device comprising a second unijunction transistor oscillator having its output operatively coupled to the control gate element of the second controlled rectifier device, and second lock out circuit means operatively coupled to said second unijunction transistor oscillator and to said load circuit for locking out the operation of the second controlled rectifier device during periods of conduction of the first controlled rectifier device.

12. The combination set forth in claim 11 wherein the lock out circuit means for the first controlled rectifier device comprises a resistance coupled transistor amplifier having its input coupled through a limiting resistor to the juncture of the series connected controlled rectifier devices, and having its out put coupled through a coupling diode to the unijunction transistor oscillator, and wherein the lock out circuit means for the second controlled rectifier device comprises a coupling resistor connected between the juncture of the series connected controlled rectifier devices and the input of the unijunction transistor oscillator, and a blocking diode interconnected between the coupling resistor and the resistance-capacitance frequency determining circuit of the unijunction transistor oscillator.

13. A controlled rectifier circuit including in combination a controlled rectifier device and a load circuit connected across a source of electric potential, a commutating circuit comprised by a capacitor and saturable inductor connected in series circuit relationship across said controlled rectifier device, means for coupling a firing signal source to the control gate element of the controlled rectifier, and lock out circuit means for locking out conduction through said controlled rectifier device for desired periods comprising a coupling circuit coupled to a point on the rectifier circuit where an under voltage condition is desired to be sensed, a diode rectifier connected across said coupling circuit and to the control gate element of said controlled rectifier device, and at least a pair of hold off diodes interconnected between said coupling circuit and the connection of the diode rectifier to the control gate element of the controlled rectifier.

References Cited in the file of this patent
UNITED STATES PATENTS
2,773,184    Rolf _____ Dec. 4, 1956